United States Patent [19]

Zankl

[11] 4,211,512

[45] Jul. 8, 1980

[54] ROTARY TABLE WITH BALLSCREW DRIVE

[75] Inventor: Frank Zankl, Brookfield, Wis.

[73] Assignee: Kearney & Trecker Corporation, West Allis, Wis.

[21] Appl. No.: 971,341

[22] Filed: Dec. 20, 1978

[51] Int. Cl.² .......................... B23Q 1/16; B23Q 17/18
[52] U.S. Cl. ..................................... 409/221; 33/1 M; 51/216 ND; 51/240 T; 74/813 C; 74/825; 269/66; 318/39; 318/602
[58] Field of Search ............... 409/221, 222, 223, 224, 409/903; 408/71; 269/66, 73; 51/216 ND, 216 M, 240 T; 33/1 M; 318/39, 85, 602; 74/813 C, 825

[56] References Cited

U.S. PATENT DOCUMENTS 3,587,390   6/1971   Lohneis et al. ..................... 409/221

OTHER PUBLICATIONS

*MM 200 Machine Maintenance Manual*, Pub. 413G., Eighth Edition, Jan. 1977, Kearney & Trecker Corp.

*Primary Examiner*—Z. R. Bilinsky
*Attorney, Agent, or Firm*—Cyril M. Hajewski

[57] ABSTRACT

A rotary table is driven by a pair of perpendicularly disposed linear slides which are each driven by a ballscrew drive. One of the linear slides is mounted on the movable member of the other linear slide and is coupled to the rotary table by a crank stud. The linear slides are driven at speeds which vary in accordance with the sine and cosine of the table angle to translate the linear slide motion into rotary motion.

6 Claims, 6 Drawing Figures

ROTARY TABLE WITH BALLSCREW DRIVE

BACKGROUND OF THE INVENTION

In the process of machining metals, as in the practice of milling, rotary tables are extensively used to securely hold the part to be milled while a rotary motion is being imparted to the work holding table itself. The angular velocity of these tables is usually very low. For a table having a diameter of about thirty inches, the maximum velocity is about four or five revolutions a minute. This rotational speed results in a rim velocity of about four or five hundred inches per minute which agrees rather well with the rapid traverse rates of speeds of milling machines linear axis slides.

Most rotary table drives use electric motors or even hydraulic motors as their primary sources of rotary motion. Since these motors are high speed devices, it normally requires some type of speed reduction unit to obtain the five revolutions per minute speed at the table. These reductions are usually gear transmissions having a reduction ratio of as much as 400 to 1. At the present state of the art, these tables are called upon to be able to make some extremely small and accurate angular movements. The size of these movements is measured in seconds of arc. A full circle contains 360 degrees of 1,296,000 seconds of arc. The usual resolution used for angular movements is one-thousandth of a degree which is 3.6 seconds of arc. When one considers the size of this small angular movement and also the great ratio of speed reduction, it becomes apparent that the smallest amount of backlash in the gear reducer transmission will greatly exceed the minimum resolution, 3.6 seconds of arc. In order to remedy this difficulty, it has been the practice to devise and build backlash elimination devices in the gear drive mechanisms. These devices are expensive, difficult to keep in adjustment and usually low in mechanical efficiency.

In the rotary designs mentioned above, it is necessary to have some device which is capable of measuring very small angles and here again, because of the backlash problem in the transmission, it is necessary to have the measuring device mounted co-axially on the table center in order that all transmission causing backlash be avoided. This calls for the measuring device to have a resolution of 3.6 seconds of arc or better. At the present time, there exist only a very few angle measuring devices that can possibly be used to measure such small angles. All are very fragile and difficult to keep in adjustment. Measuring devices of this nature are also quite expensive.

SUMMARY OF THE INVENTION

In the present invention there are no gears employed in the rotary table drive thereby eliminating any chances for backlash. This invention uses the usual linear slide type of measuring encoder attached to the lead screw which is quite inexpensive. The amount of angular motion of the table is measured with this inexpensive device. This eliminates the costly co-axially mounted encoder used on present rotary table drives. The rotary table is driven by a pair of perpendicularly disposed linear slides each of which is driven by a ballscrew drive. One of the linear slides is mounted on the movable member of the other linear slide and is coupled to the rotary table by a crank stud. In a typical application of the invention, the apparatus of this invention can achieve the same accuracy as the prior art apparatus with a ballscrew drive that is 130 times coarser in resolution than the prior art drive.

DESCRIPTION OF THE PREFERRED EMBODIMENTS

Figure 1:
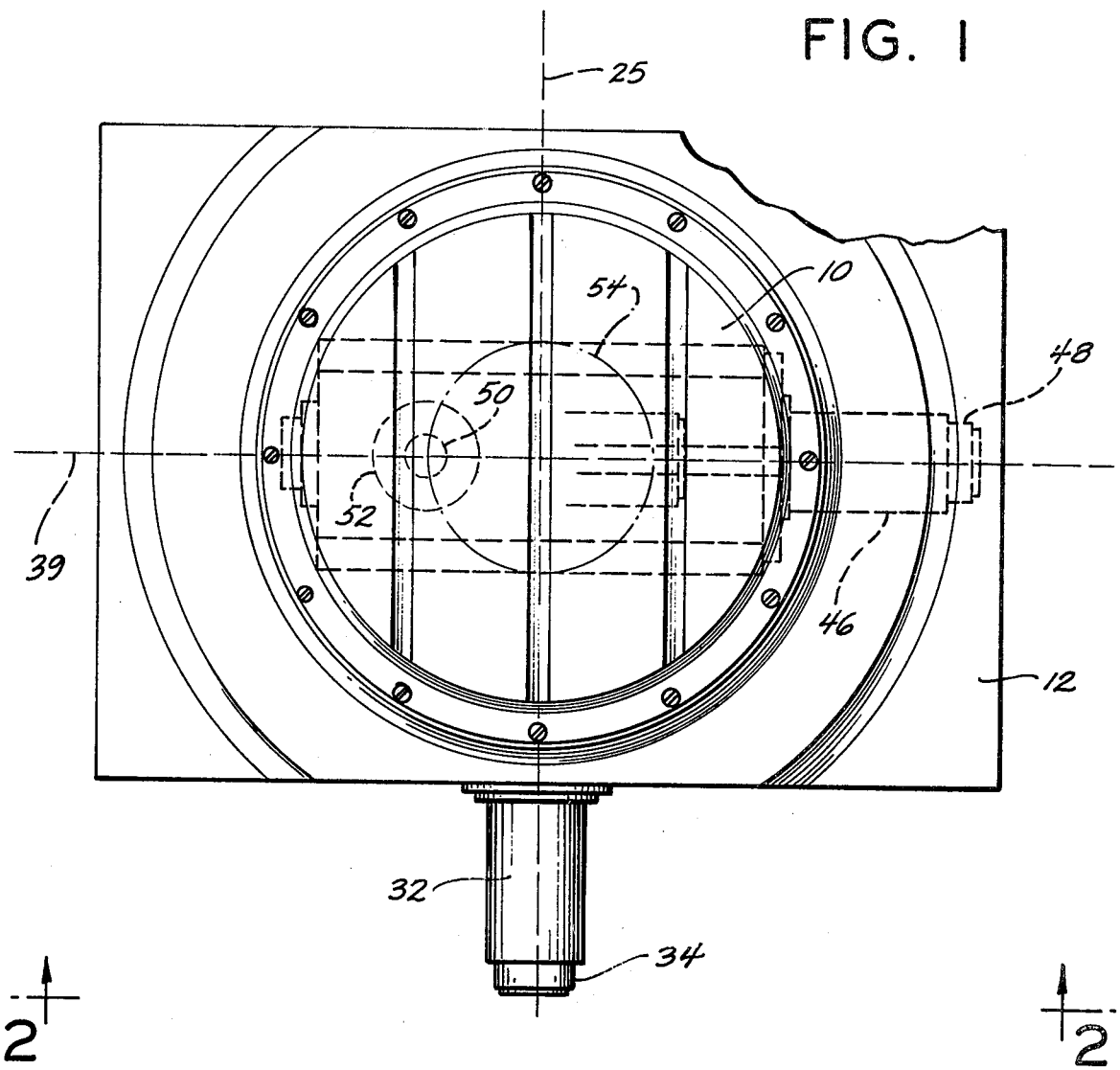
FIG. 1 is a plan view of a preferred embodiment of the invention.
Figure 2:
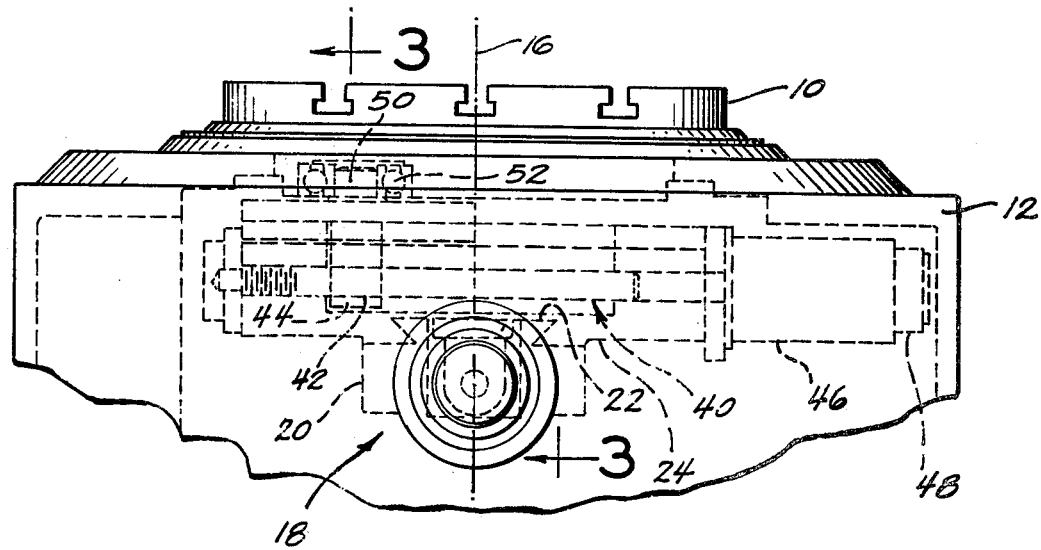
FIG. 2 is a side elevational view on the line 2—2 of FIG. 1.

Referring to FIGS. 1 and 2, a rotary table 10 is journaled to a bed 12 for rotation about a vertical axis 16 (FIG. 2). Rotary table 10 and bed 12 are part of a milling machine which is not disclosed further since this invention only applies to the rotary table portion of the milling machine.

Figure 3:
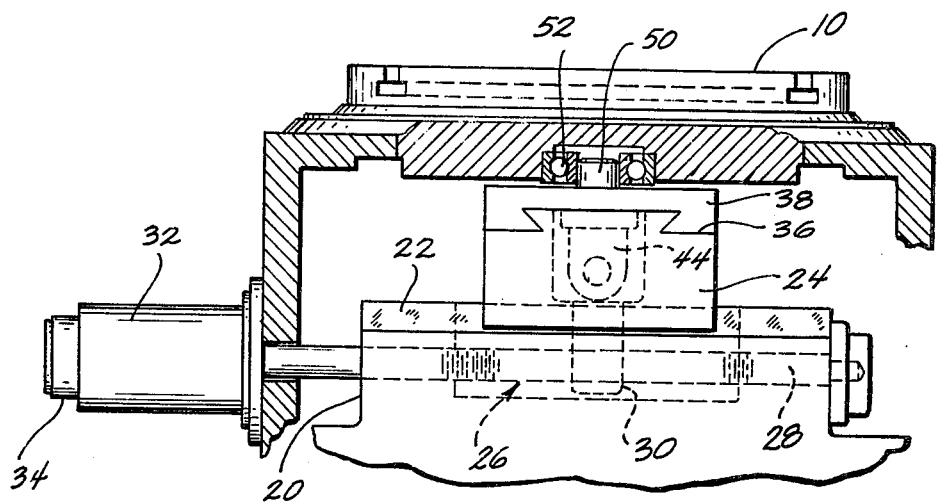
FIG. 3 is a side elevational view taken on the line 3—3 of FIG. 2.
Figure 4:
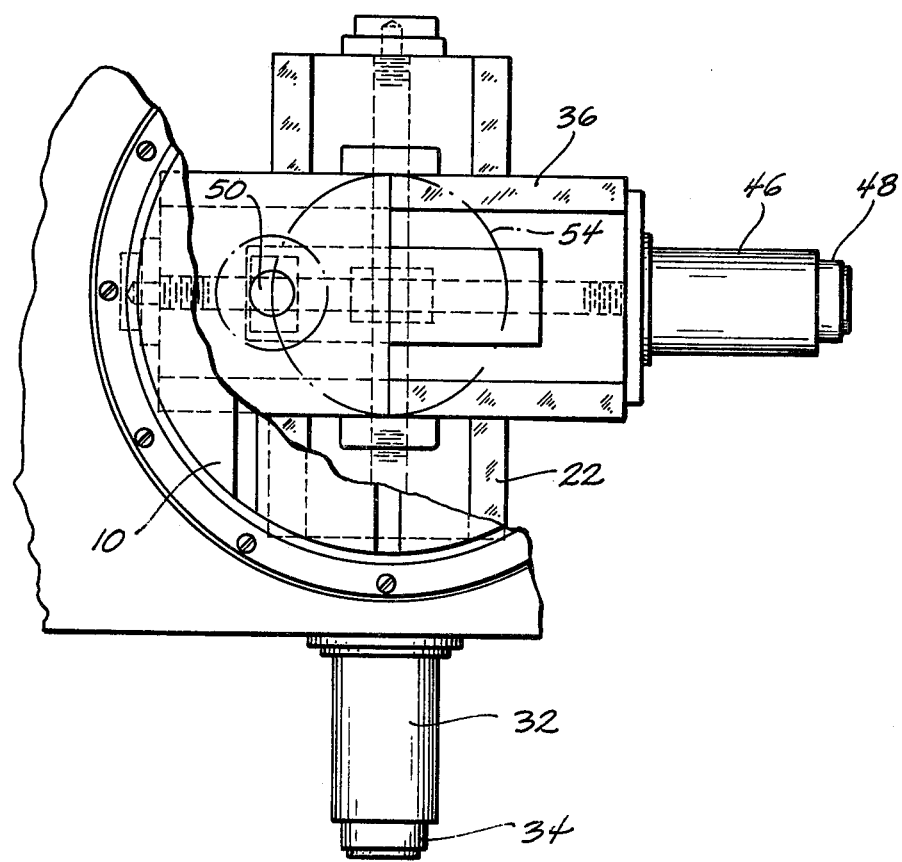
FIG. 4 is a plan view similar to FIG. 1 with portions of rotary table 10 cut away to reveal inner details.

A first slide 18 which consists of a lower member 20 (FIG. 2) carrying ways 22 and an upper member 24 is mounted on bed 12 beneath rotary table 10. Upper member 24 is slidably mounted on ways 22 for movement along axis 25 (FIG. 1) and is moved therealong by a ballscrew mechanism (FIG. 3) containing a leadscrew 28, which is journaled to lower member 20, and a ball nut 30, which is attached to upper member 24. Leadscrew 28 is rotated by a servo motor 32 which also drives an encoder 34 that provides an accurate measure of the displacement of upper slide member 24 in a very inexpensive manner. Ball nut 30 is an anti-backlash nut to prevent lost motion.

Upper slide member 24 has a pair of ways 36 (FIG. 3) formed thereon upon which a second slide member 38 is slidably mounted for movement along axis 39 (FIG. 1). Slide member 38 is driven by a second ballscrew mechanism 40 (FIG. 2) which includes a leadscrew 42 and a ball nut 44. Leadscrew 42 is journaled to upper member 24 and ball nut 44 is attached to second slide member 38. Leadscrew 42 is rotated by a servo motor 46 which also drives an encoder 48 that provides an accurate measure of the displacement of second slide 38. Ball nut 44 is an anti-backlash nut to prevent lost motion.

The axis 39 of second slide 38 is positioned at right angles to the axis 25 of first slide 18 and both axes 39 and 25 are perpendicular to rotary table axis 16. Any motion of first slide 18 is transmitted to second slide 38 due to the fact that second slide 38 is slidably mounted on the upper member 24 of first slide 18. Second slide 38 is rotatably attached to rotary table 10 by a crank stud 50 and crank bearings 52 which are displaced from axis 16. By simultaneously moving first slide 18 and second slide 38 at rates which vary in accordance with sine and cosine functions of the table angle, crank stud 50 is moved in a cranking circle 54 (FIG. 1) and therefore causes table 10 to rotate about its axis 16. Both ballscrew mechanisms 26 and 40 are of the backlash free variety, and therefore there is no loss of accuracy due to backlash. The resolution of slides 18 and 38 can be one ten-thousandth of an inch in order to obtain the necessary 3.6 seconds of arc at the surface of rotary table 10.

The ballscrew mechanisms 26 and 40 need only be long enough to handle the diameter of cranking circle 54, which can be in the order of 12 inches. Since ballscrew mechanisms 26 and 40 are very short, they can be small in diameter so that stiffness is not a limiting factor.

Figure 5:
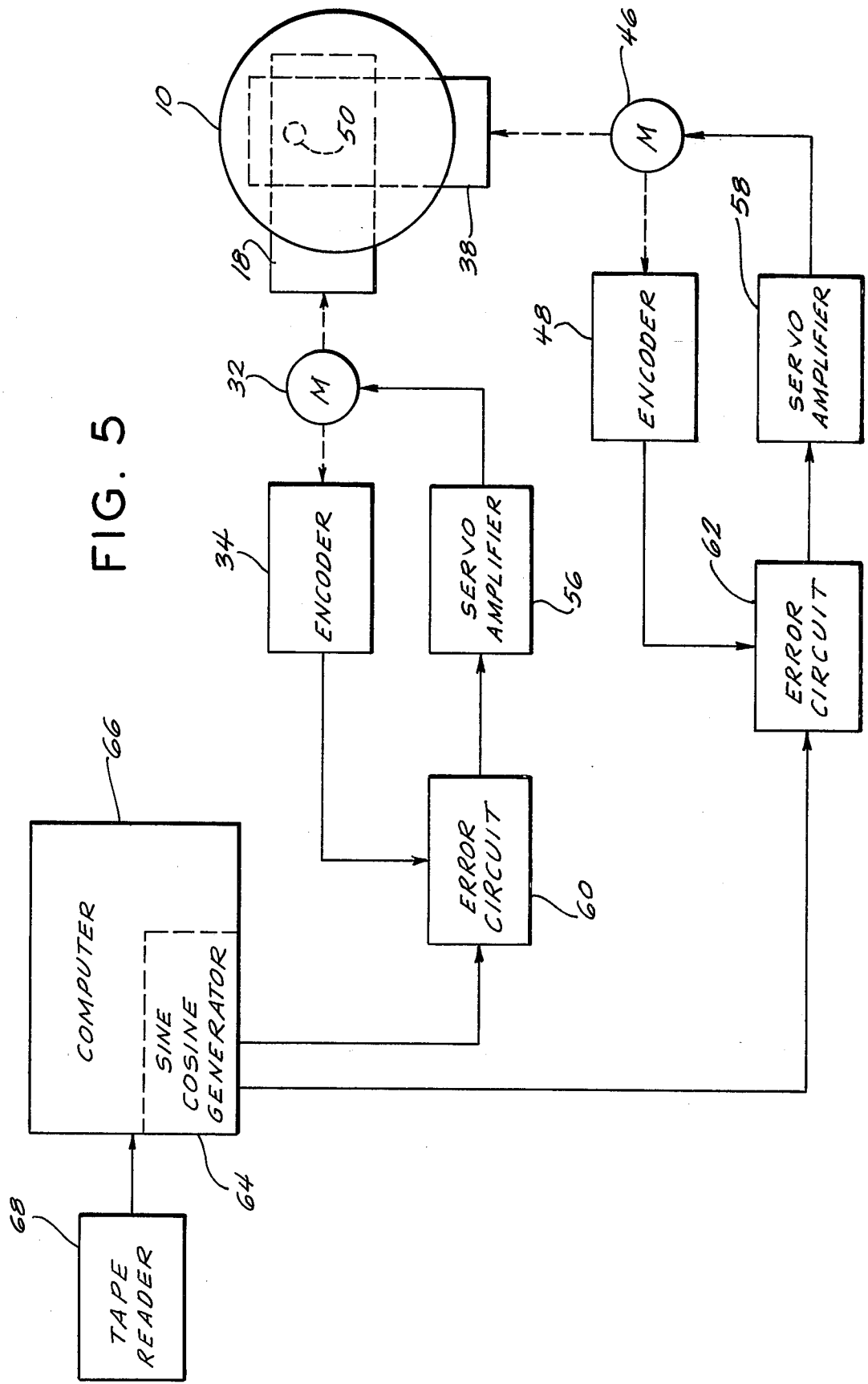
FIG. 5 is a block diagram of one illustrative control circuit for the cranking slide servo motors.

The electrical circuits which control motors 32 and 46 are illustrated in FIG. 5. Motors 32 and 46 are controlled by servo amplifiers 56 and 58, respectively, which, in turn, receive inputs from error circuits 60 and 62, respectively. Error circuits 60 and 62 receive inputs from encoders 34 and 48, respectively, and from a sine-cosine function generator 64 which is part of a computer 66. Computer 66 receives inputs from a tape reader 68 which specifies the angle at which rotary table 10 is to be turned. Sine-cosine function generator 64 produces the sine and cosine functions which specify the desired angle. The output of sine-cosine function generator 64 is applied to error circuits 60 and 62 which also receive inputs from encoders 34 and 48, respectively. The output of error circuits 60 and 62 is proportional to the difference between the angle specified by sine-cosine function generator 64 and the angle measured by encoders 34 and 48. The output signals of error circuits 60 and 62 cause motors 32 and 46 to turn until their respective slides 18 and 38 are in a position which turns rotary table 10 to the specified angle.

Figure 6:
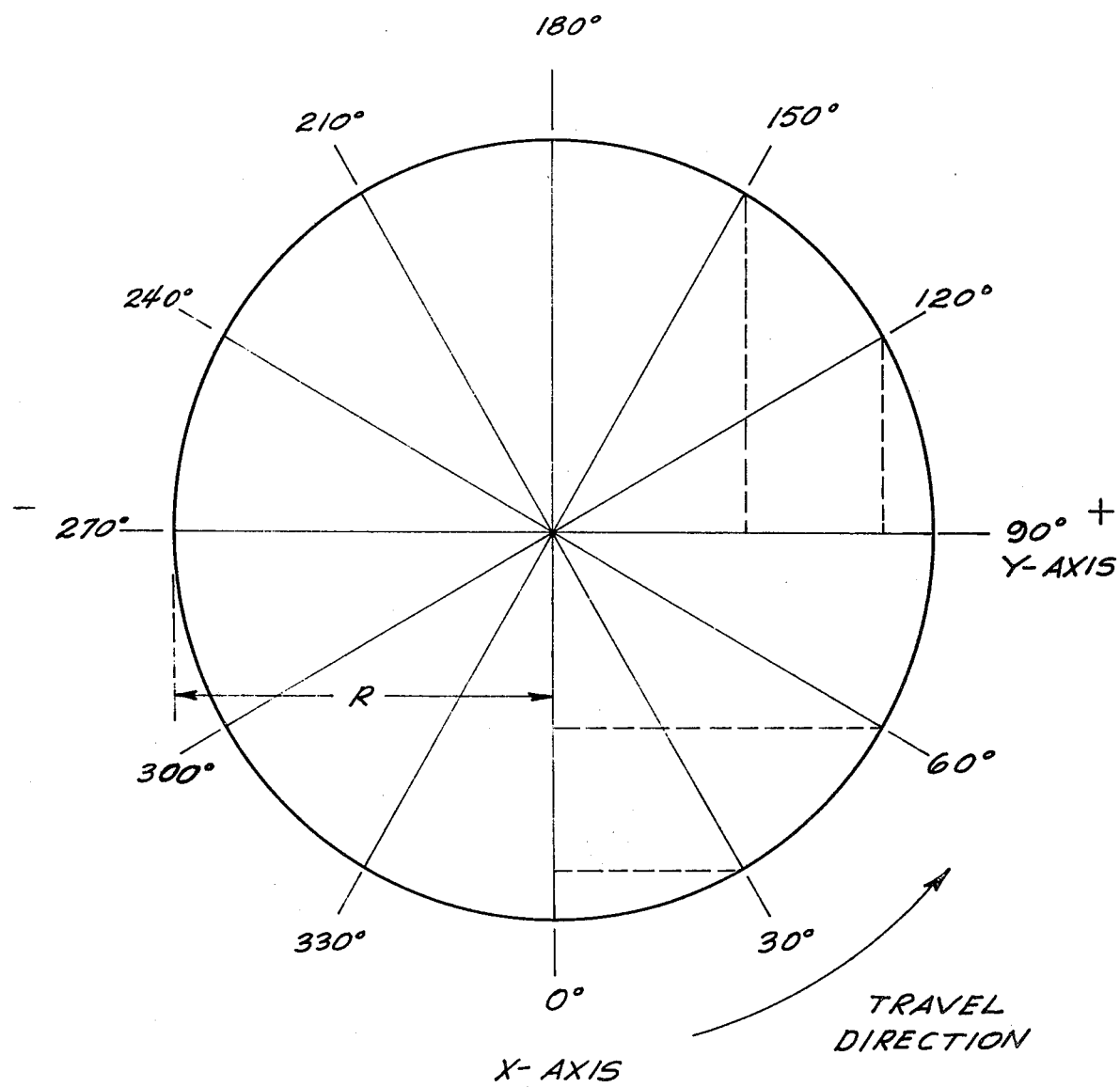
FIG. 6 is a graph illustrating the sine and cosine functions used to generate the cranking circle.

As motors 32 and 46 turn, their displacement per unit of time is controlled in accordance with the sine-cosine functions illustrated in Chart I below. The X and Y dimensions and the angles in Chart I refer to the X and Y axes and angles shown in FIG. 6. R is the radius of the cranking circle.

CHART I
SINE-COSINE FUNCTIONS

| Angle | X-Axis Travel | Y-Axis Travel |
|---|---|---|
| 0° | 0 | 0 |
| 30° | R (1 − Cos 30°) | R Sin 30° |
| 60° | R (1 − Cos 60°) | R Sin 60° |
| 90° | R (1 − Cos 90°) | R Sin 90° |
| 120° | R (1 + Sin 30°) | R Cos 30° |
| 150° | R (1 + Sin 60°) | R Cos 60° |
| 180° | R (1 + Sin 90°) | R Cos 90° |
| 210° | R (1 + Cos 30°) | −R Sin 30° |
| 240° | R (1 + Cos 60°) | −R Sin 60° |
| 270° | R (1 + Cos 90°) | −R Sin 90° |
| 300° | R (1 − Sin 30°) | −R Cos 30° |
| 330° | R (1 − Sin 60°) | −R Cos 60° |
| 360° | R (1 − Sin 90°) | −R Cos 90° |

The general formulas for any table angle $\theta$ between 0° and 90° are $X = R(1 - \cos\theta); Y = R \sin\theta$. For angles between 90° and 180°, the formulas are $X = R[1 + \sin(\theta - 90°)] Y = R \cos(\theta - 90°)$. For angles between 180° and 270°; the formulas are $X = R[1 + \cos(\theta - 180°)] Y = -R \sin(\theta - 180°)$. For angles between 270° and 360° the formulas are $X = R[1 - \sin(\theta - 270°)] Y = -R \cos(\theta - 270°)$. From these formulas, the X and Y displacements for any table angle from 0° to 360° can be calculated. In terms of physical structure, the X-axis corresponds to the axis 25 (FIG. 1) of first slide 18 and the Y-axis corresponds to the axis 39 (FIG. 1) of second slide 38.

Sine-cosine function generator 64 can be a software routine in computer 66 which solves the equations given above or it can be a hardware function generator such as disclosed in Machine Control Manual No. GME-65, for the MILWAUKEE-MATIC series $E_b$ GE solid state control, published on Nov. 1, 1966, by the Kearney & Trecker Corporation of Milwaukee, Wisconsin, and revised on Oct. 31, 1967. The function generator is described on pages 41–42 of the above-noted manual.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, I hereby claim as my invention:

1. A rotary table drive comprising:
    a frame;
    a tabel journaled to said frame for rotation about a first axis;
    a first linear slide slidably mounted on said frame for movement along a second axis perpendicular to said first axis;
    a second linear slide slidably mounted on said first linear slide for movement along a third axis perpendicular to both said first and second axes;
    a rotary crank coupling said second linear slide to said table; and
    means for simultaneously moving said first and second linear slides at variable linear speeds to cause rotary movement of said table.

2. A rotary table drive according to claim 1 wherein the last mentioned means includes a first ballscrew mechanism coupled to said first slide for moving the slide;
    a first servo motor coupled to said first ballscrew mechanism;
    a second ballscrew mechanism coupled to said second slide for moving the slide;
    a second servo motor coupled to said second ballscrew mechanism; and
    servo drive means for controlling the operation of said first and second servo motors.

3. A rotary table drive according to claim 2 wherein said servo drive means includes means for generating a drive velocity for said first servo motor and a drive velocity for said second servo motor which vary in accordance with the sine and cosine of the table angle $\theta$ in accordance with the following equations to generate respective distances X and Y that will generate the desired table angle $\theta$ with the cranking radius R:

$X = R(1 - \cos\theta); Y = R \sin\theta$ for $0° \leq \theta \leq 90°$ $X = R[1 + \sin(\theta - 90°)]; Y = R \cos(\theta - 90°)$ for $90° \leq \theta \leq 180°$ $X = R[1 + \cos(\theta - 180°)]; Y = -R \sin(\theta - 180°)$ for $180° \leq \theta \leq 270°$ $X = R[1 - \sin(\theta - 270°)]; Y = -R \cos(\theta - 270°)$ for $270° \leq \theta \leq 360°$.

4. A rotary table drive according to claim 1 wherein said rotary crank comprises a crank bearing in said rotary table and a crank stud projecting from said second linear slide and engaging said crank bearing.

5. A rotary table drive according to claim 4 wherein said crank bearing and crank stud are displaced from said first axis and rotate in a cranking circle therearound.

6. A rotary table drive according to claim 1 wherein both ballscrew mechanisms have anti-backlash nuts to prevent lost motion.

* * * * *